(12) United States Patent
Kombowski

(10) Patent No.: US 8,863,892 B2
(45) Date of Patent: Oct. 21, 2014

(54) TORSIONAL VIBRATION DAMPER WITH ARC SPRING AND END CAP

(71) Applicant: Schaeffler Technologies AG & Co. KG, Herzogenaurach (DE)

(72) Inventor: Eugen Kombowski, Malsch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/935,059

(22) Filed: Jul. 3, 2013

(65) Prior Publication Data

US 2014/0014435 A1 Jan. 16, 2014

(30) Foreign Application Priority Data

Jul. 10, 2012 (DE) .......................... 10 2012 212 004

(51) Int. Cl.
| | | |
|---|---|---|
| *F16F 15/12* | (2006.01) | |
| *F16F 15/121* | (2006.01) | |
| *G10K 11/00* | (2006.01) | |
| *F16F 15/123* | (2006.01) | |
| *F16F 15/00* | (2006.01) | |

(52) U.S. Cl.
CPC ............ *G10K 11/002* (2013.01); *F16F 15/123* (2013.01)
USPC .......................... 181/208; 181/207; 464/68.92

(58) Field of Classification Search
USPC .......... 181/208, 209, 207; 267/136, 286, 290; 464/68.92, 64.1
See application file for complete search history.

(56) References Cited

U.S. PATENT DOCUMENTS

| | | | | |
|---|---|---|---|---|
| 4,884,996 | A * | 12/1989 | Schmitt et al. ............... | 464/68.9 |
| 5,180,044 | A * | 1/1993 | Fukushima et al. .......... | 192/208 |
| 5,380,248 | A * | 1/1995 | Kraus et al. .................. | 464/66.1 |
| 5,386,962 | A * | 2/1995 | Adriance et al. ............. | 248/624 |
| 5,562,542 | A * | 10/1996 | Rohrle ......................... | 464/63.1 |
| 5,626,518 | A * | 5/1997 | Maki et al. ................... | 464/64.1 |
| 5,882,264 | A * | 3/1999 | Yabe et al. .................... | 464/64.1 |
| 6,217,451 | B1 * | 4/2001 | Kooy et al. ................. | 464/68.92 |
| 6,461,243 | B1 * | 10/2002 | Uehara ...................... | 464/68.92 |
| 7,166,030 | B2 * | 1/2007 | Jackel et al. ................ | 464/68.9 |
| 7,225,774 | B2 * | 6/2007 | Watanabe et al. .......... | 123/90.17 |
| 7,241,224 | B2 * | 7/2007 | Song et al. ................... | 464/64.1 |
| 7,297,064 | B2 * | 11/2007 | Jackel et al. ............... | 464/68.92 |
| 8,021,234 | B2 * | 9/2011 | Oono et al. ................. | 464/68.92 |
| 2002/0039925 | A1 * | 4/2002 | Uehara ........................ | 464/68 |
| 2002/0094874 | A1 * | 7/2002 | Uehara et al. .................. | 464/68 |
| 2004/0119218 | A1 * | 6/2004 | Imanaka et al. .............. | 267/286 |
| 2004/0144200 | A1 * | 7/2004 | Giordano et al. .............. | 74/574 |
| 2013/0231195 | A1 * | 9/2013 | Takenaka .................... | 464/66.1 |

* cited by examiner

*Primary Examiner* — Edgardo San Martin
(74) *Attorney, Agent, or Firm* — Simpson & Simpson, PLLC

(57) ABSTRACT

An end cap for an arc spring in a torsional vibration damper having a cylindrical section for engaging with the arc spring and a radial section at one end of the cylindrical section for engaging with an input or output side of the torsional vibration damper, the end cap being producible by shaping from a metal sheet. A torsional vibration damper for elastic transmission of torque between an input side and an output side including the described end cap for transmission of force between one of the sides and the arc spring.

12 Claims, 4 Drawing Sheets

TORSIONAL VIBRATION DAMPER WITH ARC SPRING AND END CAP

CROSS-REFERENCE TO RELATED APPLICATIONS

This application claims priority of German Patent Application No. 10 2012 212 004.1 filed on Jul. 10, 2012, which application is incorporated herein by reference in its entirety.

FIELD OF THE INVENTION

The invention relates to an end cap for an arc spring in a torsional vibration damper and to the torsional vibration damper.

BACKGROUND OF THE INVENTION

A torsional vibration damper is utilized, for example, in the drivetrain of a motor vehicle, in order to transmit torque between an input side and an output side. The input side is usually designed to introduce a torque from a drive motor, and the output side is designed to pass the torque on to a gear unit, the torque usually being transmitted in both directions. The transmission of torque occurs elastically in this case, in order to isolate torsional vibrations between the input side and the output side. The torsional vibrations may be caused in particular by non-uniform torque output from the drive motor, particularly in the case of a reciprocating internal combustion engine.

To transmit the torque elastically between the input side and the output side, an arc spring may be used, which is situated on a segment of a circumference around an axis of rotation on the input side and the output side. If the input side is rotated relative to the output side, the arc spring is compressed along the circumference. In order to prevent the arc spring from migrating radially outward, caused by the compression or by centrifugal forces, a holding element in the form of a so-called retainer is provided.

In order to transmit compression forces between the input side and the one end of the arc spring, or between the output side and the other end of the arc spring, an end cap may be provided on one or both sides of the arc spring. Depending on the design, the end cap may convey axial, or, in addition, radial forces to the arc spring. Known end caps are produced by means of a machining production process, such as turning, or by extrusion. Both fabrication methods involve relatively high production costs, and limit mass production of the end caps. Furthermore, end caps of this sort involve the use of a relatively large amount of material, so that the mass of the end caps is relatively great, which contributes to a high rotating mass of the torsional vibration damper.

BRIEF SUMMARY OF THE INVENTION

An object of the invention is to specify an end cap that can be produced economically with reduced mass. An additional object of the invention is to specify an improved torsional vibration damper having an arc spring. The invention fulfills these objects by means of an end cap and a torsional vibration.

An end cap of the invention for an arc spring in a torsional vibration damper comprises a cylindrical section for engaging with the arc spring and a radial section at one end of the cylindrical section for engaging with an input or output side of the torsional vibration damper. In this case, the end cap is producible by shaping from a metal sheet.

Advantageously, the end cap can be produced from a flat metal sheet of constant thickness through an economical shaping technique such as deep drawing, flanging or roll forming. In this way, the end cap can be fabricated quickly and economically, without using an expensive machining or shaping fabrication method. By this method the end cap can be produced economically in large quantities.

In a preferred embodiment, the end cap is designed in a single piece and with uniform thickness. Here, the thickness can correspond to the thickness of the metal sheet from which the end cap has been made. This makes it possible to avoid accumulations of material that can contribute to a high mass of the end cap. The end cap can be better shaped from the sheet metal in such a way that its sturdiness comes from its shaping, in which areas that are subject to especially heavy demands can be reinforced selectively through appropriate shaping.

In a more preferred embodiment, the end cap comprises an additional cylindrical section, the two cylindrical sections extending coaxially in relation to each other and being joined to each other at corresponding ends by means of a floor section. This shape can be produced, for example, by turning up a section of a tube toward the inside or outside by 180°. An end cap of this sort can bear heavy loads because of its structure, and can offer a point of application for the transmission of radially directed forces. In addition, both cylindrical sections can be used for bracing or fixing the arc spring. In one embodiment, the cylindrical section of the end cap located radially toward the inside is set up to actuate another arc spring, which is situated concentrically within the first arc spring.

In one embodiment, the cylindrical section is set up to engage the arc spring on its radial outer side with a clamping fit. The end cap can be joined durably to the end of the arc spring by the clamping fit. The arc spring with the end cap, or with two end caps, can form a separately manageable unit, which can be installed in a torsional vibration damper rapidly and economically. Furthermore, in this way running noises can be reduced by an arc spring raised above the end cap.

The cylindrical section can be set up to fit closely on an axial end of the arc spring. This embodiment can be particularly advantageous when the axial end of the arc spring is the additional arc spring described above, which is situated within the first arc spring. In the radial direction, the outer arc spring can be supported by the cylindrical section of the end cap, and the inner arc spring can be supported by the outer arc spring. The two arc springs can each have a relatively great diameter, and yet be frictionally joined to the end cap in a simple and efficient manner.

In one embodiment, the end cap includes a cutout which extends concentrically to a longitudinal axis of the end cap. The end cap is not dependent on a closed floor shape, and the cutout can permit engagement of an element, for example, of the input side or the output side, in order to transmit radial forces.

A torsional vibration damper of the invention, for elastic transmission of torque between an input side and an output side, comprises the input side and the output side which are rotatably situated around an axis of rotation, an arc spring which runs along a segment of a circumference around the axis of rotation, and at least one of the end caps described above, in order to transmit a force between one end of the arc spring and one of the sides.

The torsional vibration damper of the invention can be produced economically and quickly, as explained above. The mass of the torsional vibration damper, in particular the rotational mass, can be reduced by using the end cap of the invention described herein.

One of the sides of the torsional vibration damper can comprise a meshing element for transmitting force to the end cap, where the meshing element allows transmission of radial forces between the end cap and the side. In this way, at least the end sections of the arc spring can be held in a radial direction, so as to avoid contact of these sections with a holding element located radially to the outside, in particular, a retainer. That makes it possible to achieve reduced friction in the area of the ends, which can contribute to improved isolation of torsional vibrations between the input side and the output side.

Preferably, the torsional vibration damper comprises an additional arc spring, which is situated concentrically within the first arc spring and is connected in parallel to the first arc spring, with one end of the additional arc spring fitting against an axial boundary of the end cap. Thus, the torsional vibration damper can claim the advantages of the separately manageable unit of two concentric arc springs with at least one end cap, described above.

In an especially preferred embodiment, the arc spring has a reduced diameter at one end section, in order to dip into the end cap, so that the external diameter of the arc spring in a middle section corresponds to the external diameter of the end cap. Thus, the arc spring can be held securely on the end cap, while an external outline of the arc spring including at least one section of the end cap is uniform. This makes it easier to adapt the arc spring with the end cap to the spatial conditions on the torsional vibration damper, in particular, a holding element located radially toward the outside.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is fir the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
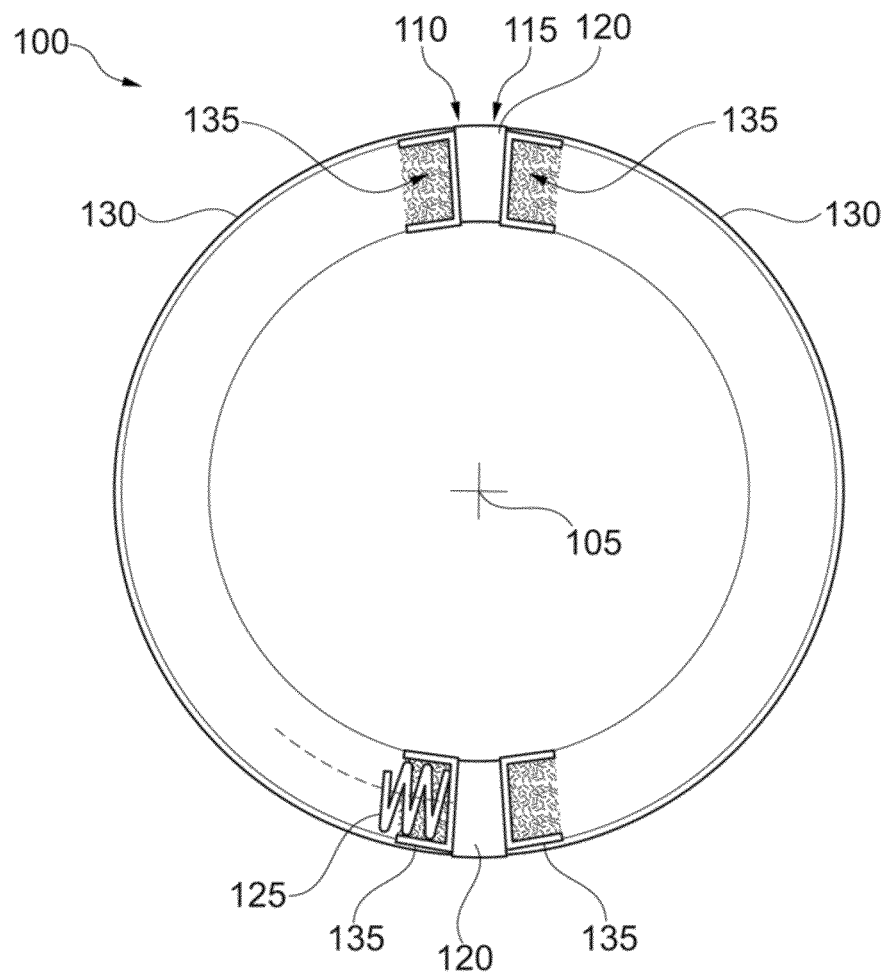
FIG. 1 is a torsional vibration damper.

Adverting to the Figures, FIG. 1 shows torsional vibration damper 100 for elastic transmission of torque in a drivetrain, in particular, in a motor vehicle.

Situated rotatably around axis of rotation 105 are input side 110 and output side 115. Input side 110 and output side 115 are offset axially along axis of rotation 105, so that in the illustration output side 115 is concealed by the input side. In one embodiment, input side 110 and output side 115 can be formed by two congruent, flat pieces of sheet metal.

Input side 110 comprises at least two meshing elements 120, which are distributed uniformly on a circumference around axis of rotation 105. Between adjacent meshing elements 120 in each case extends arc spring 125, of which an end section is depicted more exactly only on the left side of lower meshing element 120. In the embodiment depicted in FIG. 1, two arc springs 125 are provided; in other embodiments there may also be only one, or more than two arc springs 125 distributed on a circumference around axis of rotation 105.

If input side 110 and output side 115 are rotated opposite each other around axis of rotation 105 by a positive or negative angle, arc springs 125 are compressed between corresponding meshing elements 120 of input side 110 or output side 115. In order to support arc springs 125 radially toward the outside, holding element 130 is provided, which can be attached on input side 110 or output side 115.

Situated between each end of arc spring 125 and meshing element 120 of input side 110 or output side 115 is end cap 135. On the one hand, end cap 135 provides for a good transfer of force from pressure forces along the circumference around axis of rotation 105 between meshing elements 120 and arc spring 125, and on the other hand, it optionally also provides for a transmission of radial forces between meshing element 120 and the end of arc spring 125.

Different embodiments of end cap 135 are shown in FIGS. 2 through 12, and will be described in greater detail below.

Figure 2:
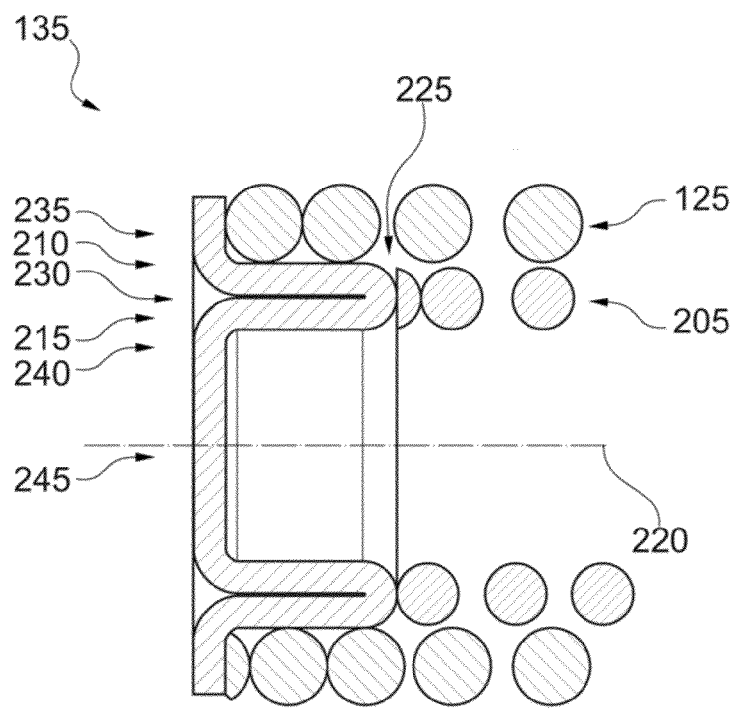
FIG. 2 is an end cap for the arc spring of the torsional vibration damper as shown in FIG. 1.

FIG. 2 shows end cap 135 from FIG. 1, together with arc spring 125 and additional arc spring 205. Additional arc spring 205, which is not absolutely necessary for using end cap 135, runs concentrically to arc spring 125 on the radial inner side of the latter. Axial ends of arc springs 125 and 205 press against end cap 135 at different points, so that arc spring 125 is longer than additional arc spring 205.

End cap 135 comprises first cylindrical section 210 and second cylindrical section 215, which extend concentrically to longitudinal axis 220 of end cap 135, and are joined to each other on a right side by means of floor section 225. Second cylindrical section 215 is located in reference to longitudinal axis 220 on a radial inner side of first cylindrical section 210, with distance 230 between two cylindrical sections 210 and 215 in the radial direction being minimal In one embodiment, distance 230 is zero, and two cylindrical sections 210 and 215 are in contact with each other.

Outer cylindrical section 210 gives way to radial section 235, which extends outward from longitudinal axis 220 in the radial direction. Connecting section 240 joins the left axial ends of second cylindrical section 215 with each other. In this case, connecting section 240 is preferably in radial alignment with radial section 235. Other embodiments, in which radial section 235 and connecting section 240 are not aligned with each other in reference to longitudinal axis 220, are also possible.

Optionally, cutout 245 may he provided in the area of connecting section 240. Cutout 245 is preferably radially symmetrical to longitudinal axis 220, and can be so large that connecting section 240 is completely eliminated. Cutout 245 can be combined with all of the embodiments of end cap 135 shown and described.

End cap 135 can be made in a single piece from metal sheet. Preferably, a flat metal sheet of constant thickness is reshaped in the manner shown and described, the constant thickness of the metal sheet preferably being maintained in the finished end cap 135. If needed, cutout 245 can be made in connecting section 240 after the shaping of the sheet.

End cap 135 is set up to fit closely against arc spring 125 in the axial direction in the area of radial cutout 235, whereby thrust forces can be transmitted between end cap 135 and arc spring 125. Preferably, arc spring 125 rests on its radial inner side with a clamping fit on the radial outer side of first cylindrical section 210.

Additional arc spring 205, if it is used, preferably rests on its axial end on floor section 225, which connects two cylindrical sections 210 and 215 with each other. In a radial direction in reference to longitudinal axis 220, additional arc spring 205 can be held by arc spring 225.

Figure 3:
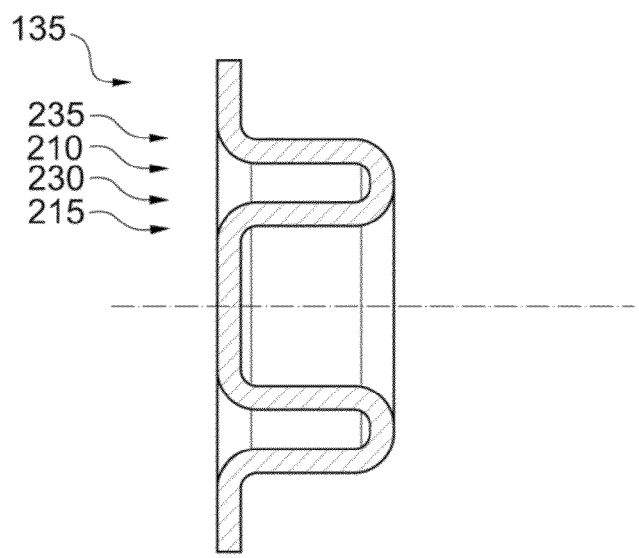
FIG. 3 is an additional embodiment of the end cap of the invention as shown in FIG. 2.

FIG. 3 shows end cap 135 from FIG. 2 in another embodiment. In contrast to the embodiment depicted in FIG. 1, distance 230 is significantly enlarged. In the embodiment depicted, distance 230 is greater than the thickness of the sheet metal from which end cap 135 is made.

Figure 4:
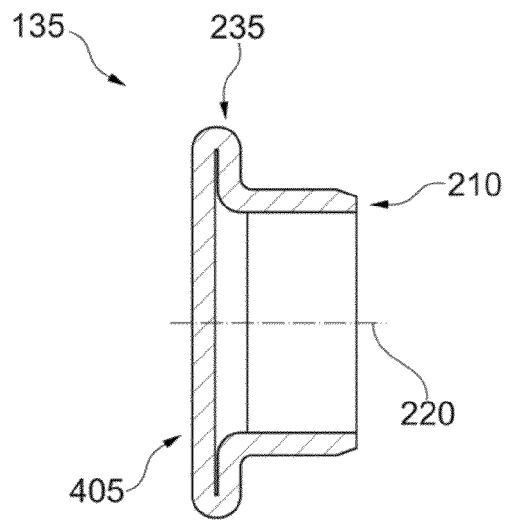
FIG. 4 is an additional embodiment of the end cap of the invention as shown in FIG. 2.
Figure 5:
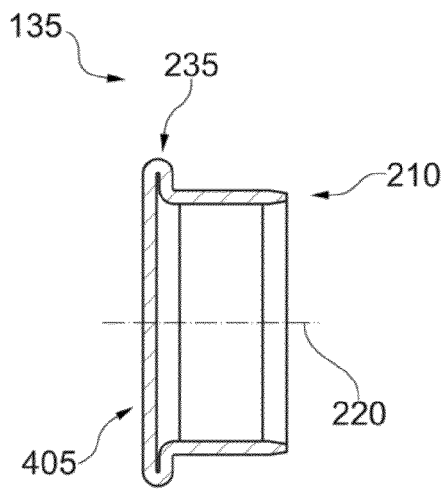
FIG. 5 is an additional embodiment of the end cap of the invention as shown in FIG. 2.

FIG. 4 and 5 show end cap 135 from FIG. 2 in another embodiment. First cylindrical section 210 for radial contact of arc spring 125 continues in radial section 235, as in the embodiment depicted in FIG. 2. Here, however, radial section 235 transitions in a 180° bend to connecting section 405, which forms a flat axial section of end cap 135 in reference to longitudinal axis 220. Second cylindrical section 215 or floor section 225 are not provided. In one embodiment, first cylindrical section 210 is chamfered radially on the outside on its right side, in order to make it easier to introduce first cylindrical section 210 into the end of arc spring 125.

FIG. 5 shows a variation of end cap 135 from FIG. 2 shown in FIG. 4. Here, the proportions of the individual sections of end cap 135 are changed, in that the diameter of first cylindrical section 210 is increased with reference to longitudinal axis 220 and radial section 235 is made correspondingly smaller. Furthermore, an additional chamfer is made on the radial inner side of first cylindrical section 210. In the depicted embodiment, an axial end of additional arc spring 205 can dip into first cylindrical section 210 of end cap 135 as far as connecting section 405 and rest axially against the latter. In this case, additional arc spring 205 can be longer than arc spring 125.

Figure 6:
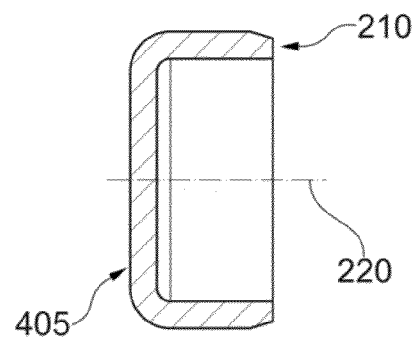
FIG. 6 is an additional embodiment of the end cap of the invention as shown in FIG. 2.

FIG. 6 shows yet another embodiment of end cap 135 from FIG. 2. This embodiment corresponds to that in FIG. 4, with radial section 235 together with the 180° bend eliminated, and first cylindrical section 210 transitioning to connecting section 405 radially toward the inside in a 90° bend.

Figure 7:
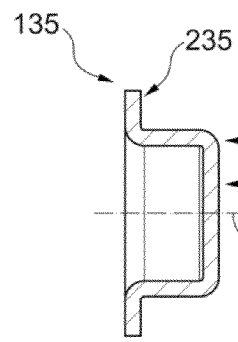
FIG. 7 is an additional embodiment of the end cap of the invention as shown in FIG. 2.
Figure 8:
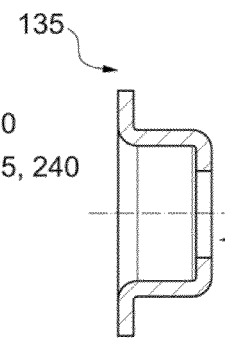
FIG. 8 is an additional embodiment of the end cap of the invention as shown in FIG. 2.
Figure 9:
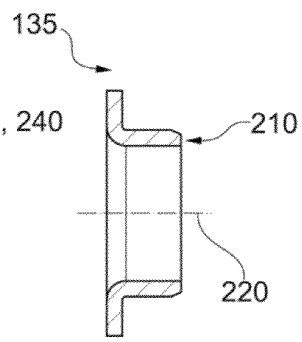
FIG. 9 is an additional embodiment of the end cap of the invention as shown in FIG. 2.

FIG. 7 through 9 show additional embodiments of end cap 135 which derive from the embodiment shown in FIG. 2, with second cylindrical section 215 being eliminated here, so that floor section 225 coincides with connecting section 240.

In the embodiment depicted in FIG. 7, end cap 135 is completely closed on the right side by floor section 225 or connecting section 240, so that additional arc spring 205 can fit closely in the axial direction in this area.

In FIG. 8, cutout 245 is made, which runs radially symmetrically to longitudinal axis 220, as described above with reference to FIG. 2. The axial end of additional arc spring 205 is supported in the remaining area of floor section 225 or connecting section 240.

In the embodiment shown in FIG. 9, cutout 245 is so large that connecting section 240 and floor section 225 are eliminated. As in the embodiment depicted in FIG. 4, first cylindrical section 210 is chamfered radially toward the outside, and a face of first cylindrical section 210 directed toward the right can be used for the axial contact of additional arc spring 205.

Figure 10:
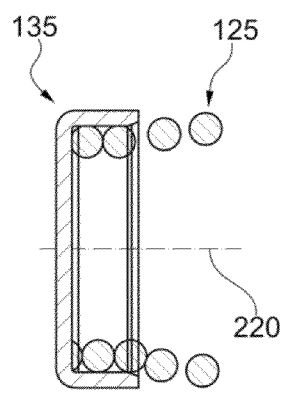
FIG. 10 is an additional embodiment of the end cap of the invention as shown in FIG. 2.
Figure 11:
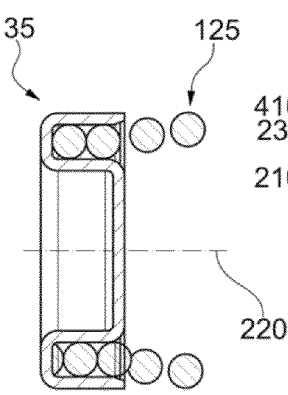
FIG. 11 is an additional embodiment of the end cap of the invention as shown in FIG. 2; and, FIG. 12 is an additional embodiment of the end cap of the invention as shown in FIG. 2.
Figure 12:
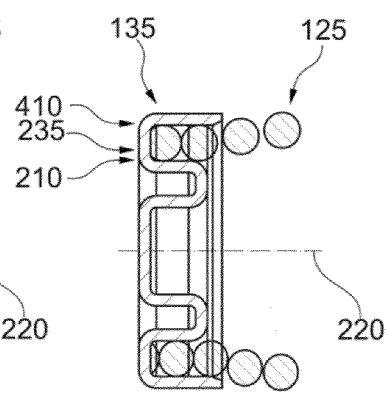

FIG. 10 through 12 show end caps 135 on arc spring 125 with an end section having a reduced diameter. The end of arc spring 125 in each case dips into end cap 135 in such a way that it fits against end cap 135 in the axial direction. An outside diameter of end cap 135 corresponds to an outside diameter of arc spring 125 outside of the end section.

The embodiment shown in FIG. 10 is based on the embodiment depicted in FIG. 6, with a chamfer made on the radial inner side of end cap 135.

The embodiment depicted in FIG. 11 is based on the embodiment depicted in FIG. 3, with radial section 235 eliminated.

The embodiment in FIG. 12 corresponds to that in FIG. 3, with third cylindrical section 410 adjoining radial section 235 radially on the outside. In the radial direction, the end section of arc spring 125 is situated between first cylindrical section 210 and third cylindrical section 410, and preferably, is clamped in place.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

Reference Numerals 100 torsional vibration damper
105 axis of rotation
110 input side
115 output side
120 meshing element
125 arc spring
130 holding element (retainer)
135 end cap
205 additional arc spring
210 first cylindrical section
215 second cylindrical section
220 longitudinal axis
225 floor section 230 distance
235 radial section
240 connecting section
245 cutout
405 connecting section
410 third cylindrical section

What is claimed is:

1. An end cap for an energy storage device in a torsional vibration damper, comprising:
 a longitudinal axis;
 a cylindrical section for engaging with the energy storage device disposed parallel to the longitudinal axis; and,
  including first and second axial ends opposite each other in an axial direction parallel to the longitudinal axis; and,
 a radial section at the first end of the cylindrical section with respect to an axial direction parallel to the longitudinal axis:
  for engaging with an input or an output side of the torsional vibration damper; and,
  extending outward from the first end in a radial direction orthogonal to the longitudinal axis;
 a first opening formed by the first axial end of the cylindrical section, aligned with the radial section in the radial direction and through which the longitudinal axis passes; and,
 a second opening formed by the second axial end of the cylindrical section through which the longitudinal axis passes, wherein the end cap can be produced by shaping from a metal sheet.

2. The end cap recited in claim 1, wherein the end cap is designed in a single piece and with a uniform thickness.

3. The end cap recited in claim 1, further comprising an additional cylindrical section, wherein the two cylindrical sections extend coaxially in relation to each other and are joined to each other at corresponding ends by means of a floor section.

4. The end cap recited in claim 1, wherein the cylindrical section is set up to engage with the arc spring with a clamping fit at its radial outer side.

5. The end cap recited in claim 1, wherein the cylindrical section is set up to fit closely at one axial end of the arc spring.

6. The end cap recited in claim 1, further comprising a cutout, which extends concentrically to a longitudinal axis of the end cap.

7. The torsional vibration damper for elastic transmission of torque between the input sideand the output side recited in claim 1, comprising:
 the input side and the output side, which are situated rotatably around an axis of rotation;
 the arc spring, which runs along a segment of a circumference around the axis of rotation; and,
 the end cap for transmitting force between one of the sides and an end of the arc spring.

8. The torsional vibration damper recited in claim 7, wherein one of the sides comprises a meshing element for transmitting force to the end cap, and the meshing element permits a transmission of radial forces between the end cap and the side.

9. The torsional vibration damper recited in claim 7, further comprising an additional arc spring, which is situated concentrically within the other arc spring and is connected in parallel to the other arc spring, where one end of the additional arc spring fits closely against an axial boundary of the end cap.

10. The torsional vibration damper recited in claim 1, wherein the arc spring has a reduced diameter at one end section, in order to dip into the end cap, so that the external diameter of the arc spring in a middle section corresponds to the external diameter of the end cap.

11. An end cap for an energy storage device in a torsional vibration damper, comprising:
 a longitudinal axis;
 a first cylindrical section:
  disposed parallel to the longitudinal axis;
  including an axial end with respect to an axial direction parallel to the longitudinal axis; and,
  for engaging with the energy storage device;
 a second cylindrical section:
  disposed parallel to the longitudinal axis; and,
  located inward of the first cylindrical section in a radial direction orthogonal to the longitudinal axis;
 an annular space, in the radial direction, between the first and second cylindrical sections; and,
 a radial section:
  extending outward from the axial end in the radial direction; and,
  for engaging with an input or an output side of the torsional vibration damper.

12. An end cap for an energy storage device in a torsional vibration damper, comprising:
 a longitudinal axis;
 a first cylindrical section:
  disposed parallel to the longitudinal axis;
  including a first axial end with respect to an axial direction parallel to the longitudinal axis; and,
  for engaging with the energy storage device;
 a second cylindrical section:
  disposed parallel to the longitudinal axis;
  including a second axial end with respect to the axial direction; and,
  located inward of the first cylindrical section in a radial direction orthogonal to the longitudinal axis;
 an annular space:
  in the radial direction between the first and second cylindrical sections; and,
  arranged to receive the energy storage device; and,
 a radial section:
  extending in the radial direction;
  connected to the first and second axial ends; and,
  for engaging with an input or an output side of the torsional vibration damper.

\* \* \* \* \*